(12) United States Patent
Baek

(10) Patent No.: US 11,353,610 B2
(45) Date of Patent: Jun. 7, 2022

(54) ESTIMATING GEOLOGICAL DIP BASED ON SEISMIC DATA

(71) Applicant: Saudi Arabian Oil Company, Dhahran (SA)

(72) Inventor: Hyoungsu Baek, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 372 days.

(21) Appl. No.: 16/139,395

(22) Filed: Sep. 24, 2018

(65) Prior Publication Data

US 2019/0094398 A1 Mar. 28, 2019

Related U.S. Application Data

(60) Provisional application No. 62/561,846, filed on Sep. 22, 2017.

(51) Int. Cl.
*G01V 1/34* (2006.01)
*G01V 1/36* (2006.01)
(Continued)

(52) U.S. Cl.
CPC .............. *G01V 1/34* (2013.01); *G01V 1/30* (2013.01); *G01V 1/364* (2013.01); *G06T 5/002* (2013.01); *G01V 2210/324* (2013.01)

(58) Field of Classification Search
CPC .... G01V 1/34; G01V 2210/324; G01V 1/364; G01V 1/30; G01V 1/302; G01V 1/307; G01V 1/306; G01V 1/345; G01V 1/28; G01V 99/005; G01V 1/40; G01V 3/02; G01V 3/38; G01V 2210/66; G01V 2210/63; G01V 2210/74; G01V 2210/64; G01V 2210/641; G01V 2210/642; G06T 5/002;
(Continued)

(56) References Cited

U.S. PATENT DOCUMENTS 6,725,174 B2 * 4/2004 Bouts ................ G06K 9/40
702/181
7,454,292 B2 11/2008 Wang et al.
(Continued)

FOREIGN PATENT DOCUMENTS

CN 103364833 10/2013
WO 2005017564 3/2005
(Continued)

OTHER PUBLICATIONS

Atan2—Wikipedia. (Aug. 5, 2017). Retrieved Dec. 18, 2020, from https://web.archive.org/web/20170805012526/https://en.wikipedia.org/wiki/Atan2) (Year: 2017).*
(Continued)

*Primary Examiner* — Yoshihisa Ishizuka
*Assistant Examiner* — Carter W Ferrell
(74) *Attorney, Agent, or Firm* — Fish & Richardson P.C.

(57) ABSTRACT

Seismic data of a subterranean region is received by data processing apparatus. The seismic data includes multiple seismic data points. For each seismic data point, gradients are computed based on the received seismic data and a dip angle is computed based on the gradients for the each seismic data point. The dip angle is smoothed using anisotropic diffusion.

14 Claims, 8 Drawing Sheets
(5 of 8 Drawing Sheet(s) Filed in Color)

(51) Int. Cl.
*G01V 1/30* (2006.01)
*G06T 5/00* (2006.01)
(58) Field of Classification Search
CPC ............. G06T 2207/20192; G06T 5/20; G06T 2207/20012; G06T 5/10; G06T 5/50; E21B 7/04; E21B 44/00; E21B 47/022; E21B 49/00; E21B 7/06; E21B 47/024; E21B 44/005; E21B 47/026; E21B 47/09; E21B 47/12; E21B 47/04; G06V 10/30
See application file for complete search history.

(56) References Cited

U.S. PATENT DOCUMENTS

| | | | |
|---|---|---|---|
| 8,213,261 | B2 | 7/2012 | Imhof |
| 8,463,551 | B2 | 6/2013 | Aarre |
| 9,482,770 | B2 | 11/2016 | Sun |
| 2008/0255761 | A1 | 10/2008 | Wang et al. |
| 2013/0064040 | A1* | 3/2013 | Imhof ................ G01V 1/30 367/73 |
| 2014/0107929 | A1* | 4/2014 | Zhong ................ G01V 3/26 702/7 |
| 2015/0117144 | A1 | 4/2015 | Sun et al. |
| 2015/0233229 | A1* | 8/2015 | Benson ............... E21B 47/06 700/275 |
| 2017/0081953 | A1* | 3/2017 | Benson ............... E21B 47/04 |

FOREIGN PATENT DOCUMENTS

| | | |
|---|---|---|
| WO | 2011149609 | 12/2011 |
| WO | 2017160273 | 9/2017 |

OTHER PUBLICATIONS ("Mean of Circular Quantities." Wikipedia, Wikimedia Foundation, Jul. 17, 2017, en.wikipedia.org/w/index.php?title=Mean_of_circular_quantities&oldid=791066569. (Year: 2017).*

("Periodic Function." Wikipedia, Wikimedia Foundation, Aug. 17, 2017, en.wikipedia.org/w/index.php?title=Periodic_function&oldid=795959379. (Year: 2017).*

Khan, Tariq M., et al. "Stopping criterion for linear anisotropic image diffusion: a fingerprint image enhancement case." EURASIP Journal on Image and Video Processing 2016.1 (2016): 1-20. (Year: 2016).*

Weickert, Joachim, and Hanno Scharr. "A scheme for coherence-enhancing diffusion filtering with optimized rotation invariance." Journal of Visual Communication and Image Representation 13.1-2 (2002): 103-118. (Year: 2000).*

GCC Examination Report issued in GCC Application No. GC 2018-36054 dated May 4, 2020, 4 pages.

GCC Examination in GCC Appln. No. GC 2018-36054, dated Jan. 9, 2020, 4 pages.

Fehmers et al., "Fast structural interpretation with structure-oriented filtering," Geophysics vol. 68, No. 4, Jul. 31, 2003, 8 pages.

Hale, "Local dip filtering with directional Laplacians," Jan. 2007, 12 pages.

International Search Report and Written Opinion issued in International Application No. PCT/US2018/052380 dated Jan. 8, 2019, 14 pages.

GCC Examination Report issued in GCC Application No. GC 2018-36054, dated Aug. 30, 2020, 4 pages.

* cited by examiner

US 11,353,610 B2

ESTIMATING GEOLOGICAL DIP BASED ON SEISMIC DATA

CROSS-REFERENCE TO RELATED APPLICATIONS

This application claims the benefit of priority to U.S. Provisional Patent Application Ser. No. 62/561,846, filed on Sep. 22, 2017, the contents of which are hereby incorporated by reference.

BACKGROUND

Seismic structure orientation data, such as describing dip and azimuth features, can be broadly used for many application. For example, seismic structure orientation is useful in performing structure-orientated smoothing and for determining dip-steered coherence and curvature attributes. Structure orientation data also provides stratigraphic and geographic information for seismic data processing and interpretation. Dip and azimuth can be computed from seismic records without picking horizons. Schemes for smoothing or averaging dips and azimuths can help suppress noise and extract large-scale features from seismic data.

SUMMARY

The present disclosure describes estimating geological dip based on seismic data.

In an implementation, seismic data of a subterranean region is received by data processing apparatus. The seismic data includes multiple seismic data points. For each seismic data point, gradients are computed based on the received seismic data and a dip angle is computed based on the gradients for the each seismic data point. The dip angle is smoothed using anisotropic diffusion.

The previously described implementation is implementable using a computer-implemented method, a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the described subject matter can improve the operation of a computer by reducing computer storage requirements and improving the computational efficiency. For example, the described subject matter can compute dips of geological structures using the gradients of seismic images without computing structural tensors or their eigenvalues. Dip fields computed from seismic images provide useful information for model building as well as for interpretation. Second, the described subject matter does not require user input or tuning parameters such as a smoothing radius, weighting factors, or weighting profiles. Third, the described subject matter allows smoothing angles with continuity to get a smooth dip field without loss of resolution, thus avoiding directional ambiguities and improving smoothing accuracy. Fourth, when dip angles are close to 90 or −90 degrees, the described subject matter addresses the problematic averaging of gradient vectors. Other advantages will be apparent to those of ordinary skill in the art.

The details of one or more implementations of the subject matter of this specification are set forth in the Detailed Description, the claims, and the accompanying drawings, and the claims. Other features, aspects, and advantages of the subject matter will become apparent from the Detailed Description, the claims, and the accompanying drawings.

DESCRIPTION OF DRAWINGS

The patent or application file contains at least one color drawing executed in color. Copies of this patent application publication with color drawing(s) will be provided by the Patent and Trademark Office upon request and payment of the necessary fee.

Like reference numbers and designations in the various drawings indicate like elements.

DETAILED DESCRIPTION

Figure 1:
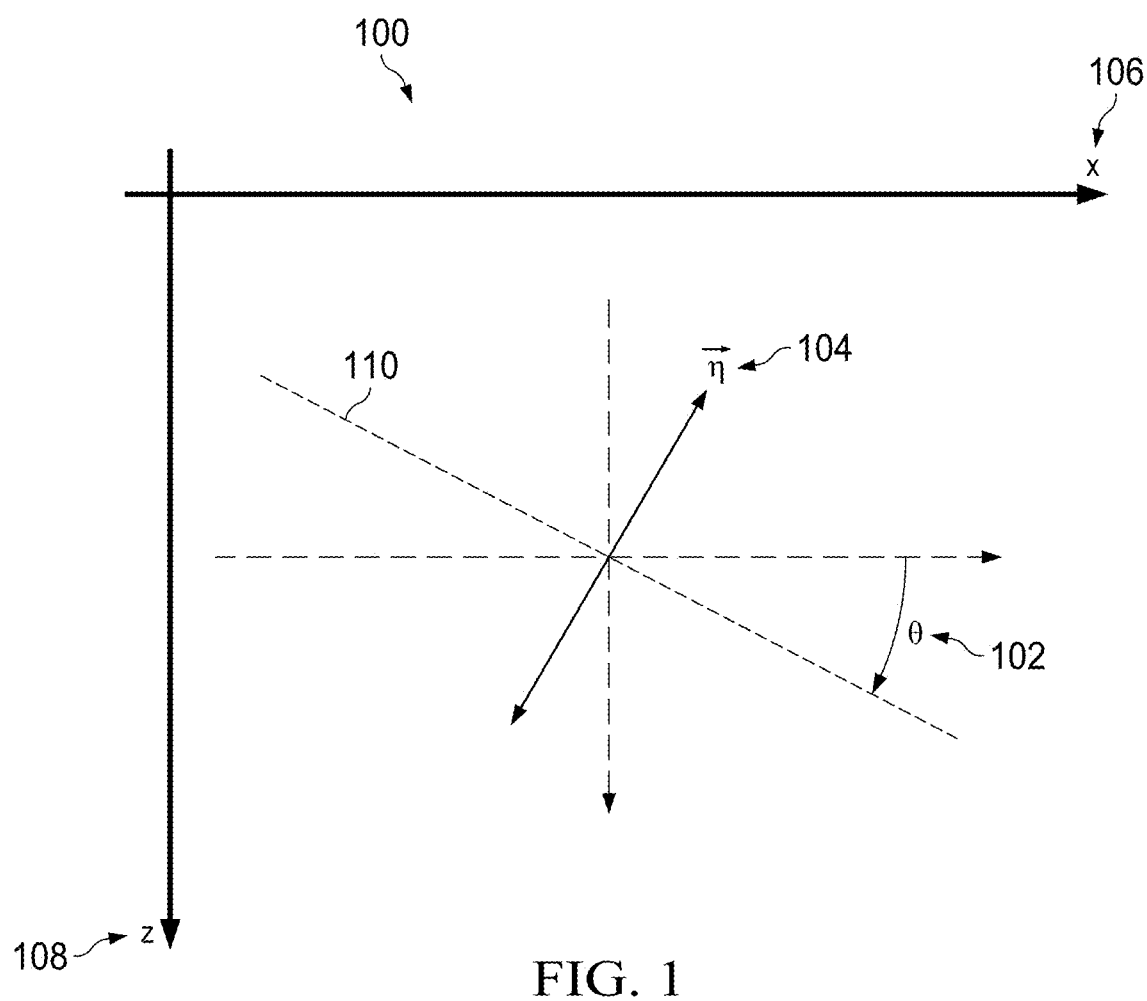
FIG. 1 is a data plot illustrating an example dip event with a dip angle $\theta$, according to an implementation of the present disclosure.

The following detailed description describes estimating geological dip based on seismic data, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Dip angles ($\theta$ or $\phi$) in seismic images are the angles between the horizontal axis (for example, an x- or y-axis) and reflection events, while dips are the slopes of the events in the physical space. Dip angles and dips are related according to $dip_x=\tan(\theta)$ and $dip_y=\tan(\phi)$. Dip fields computed from seismic images provide useful information for model building as well as for interpretation. For seismic image processing, dip fields provide anisotropic smoothing functions with critical information, which permits, for example, direction-dependent smoothing. Dips can be used to enhance the quality of seismic images for interpretation by smoothing the seismic images along dip (events) but not across the dip events. As a result, seismic amplitudes along the events become more continuous and anomalies such as speckles are removed, which improves visibility of those seismic events and less strenuous identification of seismic events.

Dip fields without smoothing are noisy but retain the resolution of given seismic images. In order to get a smooth dip field without a loss of resolution, dip angles are smoothed along dip directions. For example, obtaining dips from noisy seismic images is important not only for interpretation but also for model building (for example, velocity or anisotropy models). Such models are important input for modern depth imaging methods such as reverse time migration or Kirchhoff migration. Without correct velocity models, seismic images will not be either accurate or clear. Typically, the velocity models are three-dimensional (3D) data on equidistant grids. Getting an accurate dip field is not straightforward because seismic images contain noise and smoothing itself requires the dip information. The described techniques can improve robustness and stability of dip estimation. Compared to conventional spatial smoothing, the described techniques can retain a particular resolution or lead to a higher resolution than that of given input seismic images, even when the seismic images have complicated structures.

Conventional methods for smoothing dip angles of geological structures may be satisfactory when dip angles are small, that is, when the geological structures are more or less flat with respect to a horizontal plane. However, the conventional method may prove problematic when the geological structures are steep, that is, associated angles are close to, or at, either 90 or −90 degrees with respect to the horizontal plane. For example, there may be a discontinuity of angle at −90 or 90 degrees. The discontinuity of angle can result from an arithmetical average of two angles being significantly away from either one of the two angles. As on example, the arithmetical average of two vertical vectors, for example, $\theta_1=90$ and $\theta_2=-90$, is zero. In another example, both 0 degree and 180 degrees dips are horizontal events, but their average, oriented at 90 degrees, is vertical. Therefore, in some instances, a simple arithmetical average does not work well for smoothing dips unless corrective actions are taken to account for a discontinuity of angle.

Techniques for smoothing directions (angles) in an anisotropic fashion are described. The described techniques can be used to indirectly smooth dips while honoring the continuity of dips from −90 to 90 degrees during smoothing. For example, using the described techniques, an average of two oppositely directed vertical vectors (such as, $\theta_1=90$ degrees and $\theta_2=-90$ degrees) is not zero degrees, but 90 degrees.

In some implementations, the described techniques compute dip fields using the gradients of seismic images without building or smoothing structural tensors. In some instances, the described techniques do not require user input parameters (such as, a smoothing radius, weighting factors, or weighting profiles). In some implementations, the described techniques can use point-wise dip angles and anisotropic smoothing with anisotropic diffusion, where the anisotropic diffusion can be performed using noisy point-wise dip angles. Accordingly, the described techniques represent a self-starting method that, apart from seismic images, does not require extra inputs. Smoothed dip angles can be converted to dip fields using the previously-described relation $dip_x=\tan(\theta)$. The dip fields retain the resolution of the input seismic images due to the use of the anisotropic smoothing. Instead of computing gradients in a point-wise manner, a smooth vector field of derivatives can be obtained in an inverse fashion, with regularization.

In some implementations, an example high-level smoothing method can include: (1) constructing two scalar fields $u(x, y)=\cos(2\theta(x, z))$, $v(x, y)=\sin(2\theta(x, z))$ from angle $\theta(x, z)$; (2) smoothing $u(x, y)$ and $v(x, y)$ using anisotropic diffusion (for example, by solving an anisotropic heat diffusion equation); (3) constructing a smoothed angle $\theta(x, z)$ from the smoothed $u(x, z)$ and $v(x, z)$ using the relation $\tan(\theta)=v/u$. The described techniques can be shown to improve the operation of a computer, for example, by reducing computer storage requirements, and enhancing computational efficiency of one or more aspects of the computer (for example, by reducing processor power consumption and computing delays due to unnecessary processor utilization).

As particular examples, the described techniques do not need to compute structure tensors (a spatial average of the outer product of a gradient) at each point and do not need to store structure tensors (which is memory expensive—both in volatile and non-volatile memory) at each point. As such, computer storage requirements can be reduced (for example, by 4-6 times). Computer bus speeds, network speeds, and processor utilization can also be enhanced as less overall data needs to be processed. For example, the described techniques do not need to average components of structure tensors, do not need to perform convolution with a filter for averaging, and do not need parameters to perform a convolution. In some implementations, a smoothing algorithm can be implemented that does not require user parameters (such as, the smoothing radius or the choice of smoothing kernels). The described techniques are also automatic and less user dependent (for example, not requiring human effort or repetitive trial-and-error, which are typically required in conventional methods). The described techniques can be used to obtain a smooth dip field from a noisy dip field without much parameter tuning.

The described techniques can improve the accuracy in smoothing angles (for example, inavoiding erroneous averages, especially when structure dips are high). The described techniques can handle weak signal and low quality images, where phase is honored more than amplitude. Because the described techniques use anisotropic smoothing that reduces or avoids removing detailed information, a high resolution dip estimate can be provided for interpretation or later use.

The described techniques can be used in various applications, such as, geological structural interpretation, high-resolution stratigraphic interpretation, and analysis of image attributes. In some implementations, the described techniques can achieve high-resolution geological dip estimation. For example, the output of the described techniques can include smoothed seismic data. The smoothed seismic data can be represented, for example, in a visual image for geological structural interpretation. The described smoothing techniques can make the resulting visual image more appreciable, for example, in a manner similar to a noise removal or motion stabilization with respect to a digital-type camera. In some implementations, the output of the described techniques can impact a drilling decision. For example, the output of the described techniques can used by a computer or be included as part of a data package uploaded to a separate computer that is used to design, plan, control, or otherwise manage a drilling system. In some implementations, the computer or separate computer can use the output of the method to cause actions related to tangible equipment. For example, the described techniques could be used to directly control a hydrocarbon-recovery-type drill (such as, direction or speed), other related equipment (for example, a monitoring or controlling computing system), raise an alarm, send notifications, or other operation consistent with this disclosure.

FIG. 1 is a data plot 100 illustrating an example dip event 110 with a dip angle θ dip angle 102, according to an implementation of the present disclosure. The horizontal x axis 106 represents the distance while the vertical y axis 108 represents the depth. A vector n 104 is normal to the dip event 110 with dip angle θ 102. If a dip event 110 is parallel to the x axis 106, the dip angle 102 is zero. In this disclosure, if a dip event 110 is tilted (rotated) in a clockwise direction up to π/2, then the dip event 110 is considered to have a positive value. The dip angle θ 102 ranges from −π/2 to π/2 with π periodicity. The dip angle θ 102 can be found between the vertical axis (for example, z-axis 108) and the normal vector n 104 to an event. The normal vector n to a dip event 110 can be obtained from the gradient vector of an image u(x,y,z) after normalization.

The normal vectors to steep (vertical) events have dip angles close to ±π/2. Simple averaging of these vectors turns out to be a normal vector to flat events, which leads to not only wrong direction but also the wrong magnitude. An example algorithm is described that works even when two gradient vectors are pointing opposite directions. The example algorithm can include weighted averaging of two gradient vectors.

In some implementations, to get an average of vectors (gradients), the magnitude and the angle can be treated separately as follows. For two gradient vectors $\vec{v}_1$ and $\vec{v}_2$, defined as $\vec{v}_1 = V_1(\cos(\theta_1), \sin(\theta_1))$ and $\vec{v}_2 = V_2(\cos(\theta_2), \sin(\theta_2))$, respectively. $\theta_1$ and $\theta_2$ are between $-\pi/2$ and $\pi/2$. The average vector can be defined as $\vec{v}_{avg} = V_a(\cos(\theta_a), \sin(\theta_a))$, where the magnitude of the average vector is defined as $$V_a = \frac{1}{2}(V_1 + V_2).$$

To calculate the average angle $\theta_a$, one example algorithm is provided in Table 1. We propose the following procedure in Algorithm 1 to get the average angle ($\theta_a$). This example algorithm can be used for averaging discrete number of gradient vectors around an image point. Another algorithm that works better with anisotropic smoothing algorithm is provide in Table 2.

TABLE 1

Example Algorithm for
Determining an Angle of
Average Gradient Vectors

Algorithm 1 Finding the angle
of average gradient vectors

Input vectors: two gradients $\vec{v_1}$ and $\vec{v_2}$
Compute magnitudes (V) and angles (θ):
　　$V_1 = \|\vec{v_1}\|$, $V_2 = \|\vec{v_2}\|$
　　$\theta_1 = \arg(\vec{v_1})$, $\theta_2 = \arg(\vec{v_2})$
Compute a weighting factor λ:

$$\lambda = \frac{V_1}{V_1 + V_2}$$

Find the difference:
if $|\theta_1 - \theta_2| \leq \pi/2$ then $$\vec{v_a} = \frac{\lambda \vec{v_1} + (1-\lambda)\vec{v_2}}{2}$$

else if $\theta_1 - \theta_2 \geq \pi/2$ then $$\vec{v_a} = \frac{\lambda \vec{v_1} - (1-\lambda)\vec{v_2}}{2}$$

else if $\theta_2 - \theta_1 \geq \pi/2$ then $$\vec{v_a} = \frac{-\lambda \vec{v_1} + (1-\lambda)\vec{v_2}}{2}$$

end if
Compute the angle ($\theta_a$):
　　$\theta_a = \arg(\vec{v_a})$
Apply the periodicity:
if $\theta_a \leq -\pi/2$ then
　　$\theta_a \leftarrow \theta_a + \pi$
else if $\theta_a > \pi/2$ then
　　$\theta_a \leftarrow \theta_a - \pi$
end if Table 2 illustrates an example algorithm or pseudo code for a two-dimensional (2D) dip angle estimation in the x-z plane, according to an implementation. The dip in the x-y plane can be estimated in an analogous fashion. The gradient of an image u(x,z) is denoted as $(u_x, u_z)$.

TABLE 2

Example Dip Estimation Algorithm

Algorithm 2: Dip Estimation

Step 110: Compute the gradient $u_x$, $u_z$:

$$u_x \leftarrow \frac{u[i+1, j] - u[i-1, j]}{2\Delta x}$$

$$u_z \leftarrow \frac{u[i, j+1] - u[i, j-1]}{2\Delta z}$$

Step 120: Compute the angle θ:
　　$\theta \leftarrow \text{atan2}(u_x, u_z)$

TABLE 2-continued

Example Dip Estimation Algorithm

Algorithm 2: Dip Estimation

Step 130: Apply the pedodicity:
If:

$$\theta \leq -\frac{\pi}{2}$$

Then:
$\theta \leftarrow \theta + \pi$
Else if:

$$\theta > \frac{\pi}{2}$$

Then:
$\theta \leftarrow \theta - \pi$
End if
Step 140: Smooth the dip angle ($\theta$):
  Solve the anisotropic diffusion equation
(1) with an initial condition,
u (x, z, t = 0) = cos(2$\theta$(x, z)). The
solution with this initial condition is
denoted by $u_1$.
  Solve the anisotropic diffusion equation
(1) with an initial condition,
u (x, z, t = 0) = sin(2$\theta$(x, z)). The
solution with this initial condition is
denoted by $u_2$.
  Compute the smooth angle ($\theta$) =
arctan2( $u_1$, $u_2$).

In some implementations, a point-wise dip field $\theta(x,z)$ can be smoothed using the following anisotropic diffusion equation (1):

$$\frac{\partial u(x, z, t)}{\partial t} = \nabla \cdot [D(x, z) \nabla u(x, z, t)], \quad (1)$$

where the diffusion coefficient is given as $$D(x, z) = I - \alpha N_x^T N_x = \begin{bmatrix} 1 - \alpha s^2\theta & \alpha s\theta c\theta \\ \alpha s\theta c\theta & 1 - \alpha c^2\theta \end{bmatrix}, \quad (2)$$

where s$\theta$, c$\theta$, s$^2\theta$, and c$^2\theta$ denote sin $\theta$, cos $\theta$, sin$^2$ $\theta$, and cos$^2$ $\theta$, respectively. The generalization parameter $\alpha$ is 1 in this example. If the parameter $\alpha$ is set to 0, then the diffusion equation becomes an isotropic heat diffusion equation. The diffusion tensor may have different forms. The benefits of the proposed diffusion tensor are two-fold. First, with $\alpha$=1, it is an anisotropic diffusion tensor, which allows only smoothing along the events but not across the events. Second, the diffusion does not depend on the magnitudes of the gradient vectors, which makes the algorithm work in seismic images with weak amplitudes.

The function u(x,y,z) in Equation (1) denotes either cos(2$\theta$) or sin(2$\theta$). Since $\theta$(x,y,z) or $\psi$(x,y,z) are not continuous from $\pi$ to $-\pi$, smoothing $\theta$ and $\psi$ can be problematic when they are close to $\pi$ and $-\pi$. Hence, $u_c$(x,y,z)=cos(2$\theta$) and $u_s$(x,y,z)=sin(2$\theta$) can be smoothed using the anisotropic diffusion equation (1). After smoothing is done, the smoothed $u_c$ and $u_s$ can be used to smoothed dip angle using Equation (3):

$$\theta(x) = \mathrm{atan}\, 2(u_s(x), u_c(x))/2 \quad (3).$$

Equation (3) can be discretized, for example, with the forward Euler scheme in time and the central difference in space, which results in an explicit solver with first-order and second-order accuracy in time and space, respectively. The operator norm (the largest eigenvalue) of the diffusion tensor in Equation (2) is 1. The resulting maximum pseudo-time step size is $$\frac{1}{2}\left[\frac{1}{\frac{1}{\Delta x^2} + \frac{1}{\Delta z^2}}\right] \text{ and } \frac{1}{2}\left[\frac{1}{\frac{1}{\Delta x^2} + \frac{1}{\Delta z^2} + \frac{1}{\Delta y^2}}\right]$$

for 2D and 3D, respectively.

In 3D, the diffusion tensor can be computed in a similar fashion using a unit vector normal to a dip plane:

$$D = I - \alpha N^T N \quad (4),$$

where 0≤$\alpha$≤1 is a control parameter for the anisotropic smoothing. In some implementations, the diffusion tensor is computed for each iteration because the angle can be updated during the previous iteration. The diffusion tensor can be computed on the fly without the need to store them, when the dip fields are updated. For example, setting $\alpha$ to 0 is equivalent to isotropic smoothing while setting $\alpha$ to 1 is equivalent to anisotropic smoothing. The unit normal vector N of an event can be computed from the cross product of two unit vectors: $N_x$ and $N_y$, where $N_x$ and $N_y$ are unit vectors in x-z plane and y-z plane, respectively. The unit vectors $N_x$ and $N_y$ are defined as in Equations (4) and (5), respectively:

$$N_x = [\cos\theta\, 0\, \sin\theta]^T \quad (5), \text{ and}$$

$$N_y = [0\, \cos\phi\, \sin\phi]^T \quad (6).$$

Here, $\theta = \theta_x$ and $\phi = \theta_y$ are used to denote the dip angle in x-z and y-z plane, respectively. The symmetric diffusion tensor D(x,y,z) is given in Equation (6):

$$\begin{bmatrix} 1 - \alpha c^2\varphi s^2\theta & -\alpha c\varphi s\varphi c\theta s\theta & \alpha c^2\varphi s\theta c\theta \\ & 1 - \alpha s^2\varphi s^2\theta & -\alpha s\varphi c\varphi c^2\theta \\ & & 1 - \alpha c^2\varphi c^2\theta \end{bmatrix}. \quad (7)$$

In this example, the symmetric diffusion tensor D(x,y,z) is obtained using only $\theta$ and $\phi$=$\varphi$ that can be directly obtained from the input images, without other user tuning parameters such as a smoothing radius or a weighting parameter like weighted averaging methods. Hence, the method is almost parameterless.

Figure 2B:
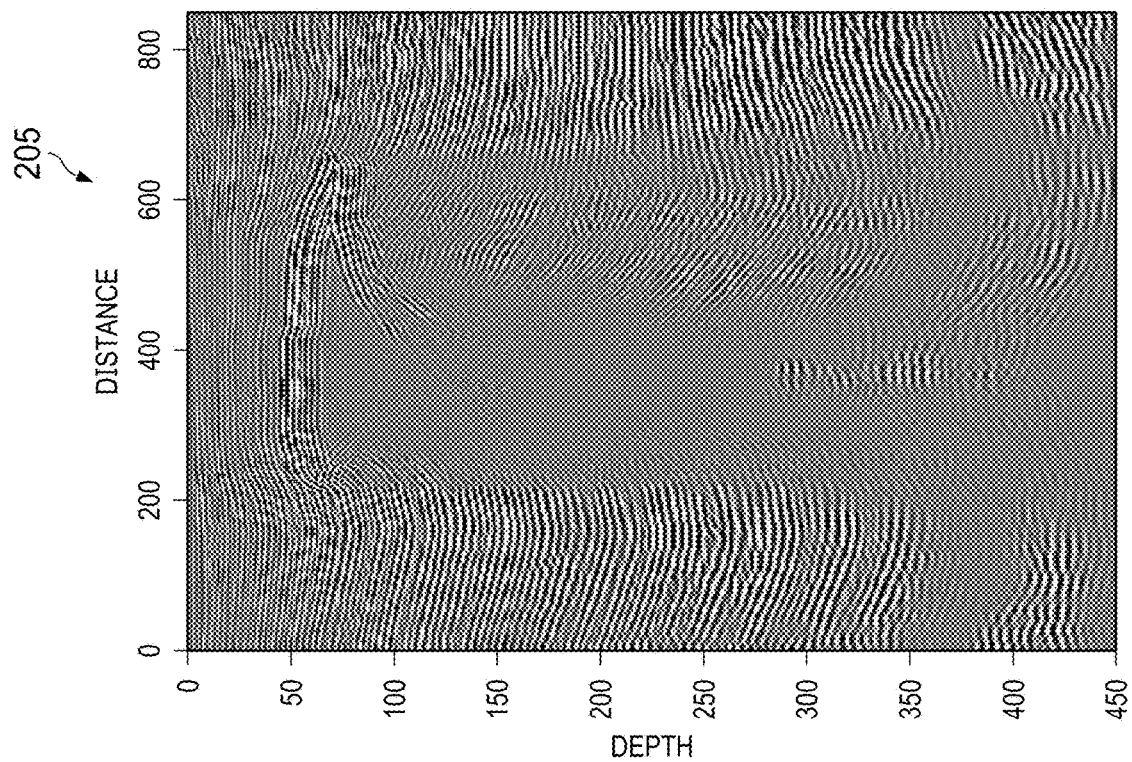
FIGS. 2A and 2B are data plots illustrating example input seismic images for sedimentary layers and a salt body, respectively, according to an implementation of the present disclosure.
Figure 2A:
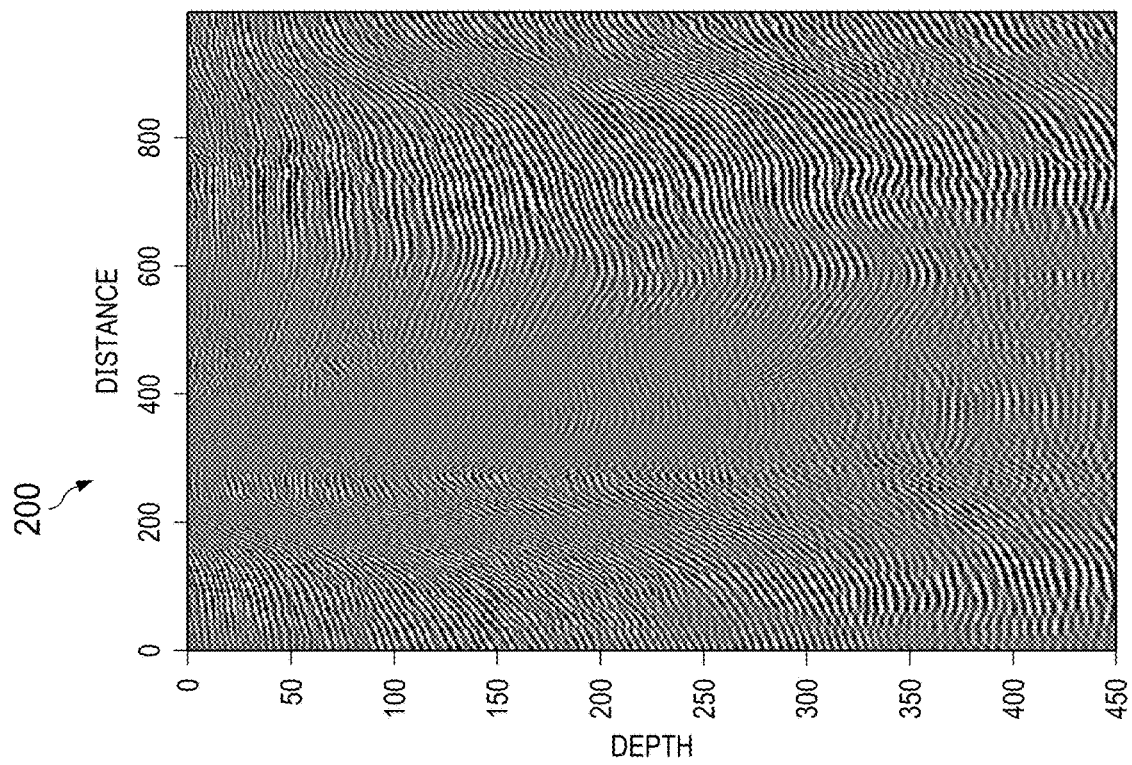

FIGS. 2A and 2B are data plots illustrating example input seismic images 200 and 205 for sedimentary layers and a salt body, respectively, according to an implementation of the present disclosure. In FIGS. 2A and 2B and FIGS. 3-9C, the horizontal axes represent distance while the vertical axes represent depth (for example, both distance and depth measured in meters). The seismic images 200 and 205 are obtained from British Petroleum (BP) 2007 tilted transversely isotropic (TTI) model using standard reverse time migration. The number of grid points of the two input images are 451 by 1000 and 451 by 850 (in pixels) in vertical and horizontal directions, respectively. The results are compared with those from dip estimation by plane wave destruction (PWD) method. For the sedimentary layer case in FIG. 2A, the initial dip estimates are compared with and without polarity reversal, that is, the application of $\pi$ periodicity.

Figure 3:
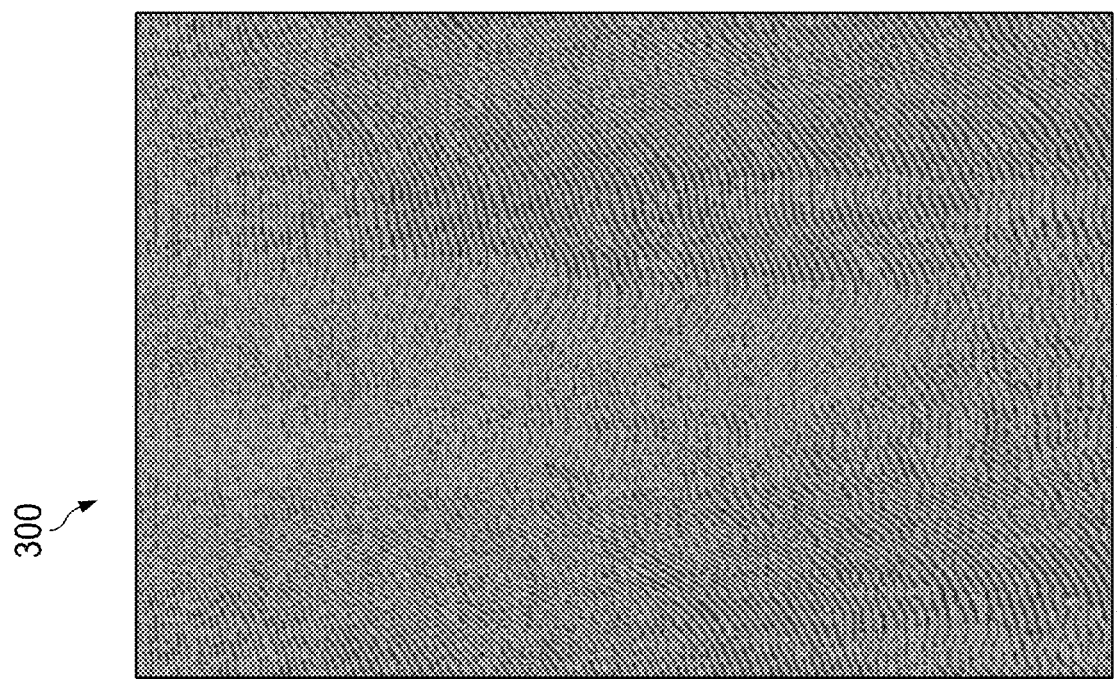
FIG. 3 is a data plot illustrating example dip angle estimates based on the seismic image 200 in FIG. 2A before the $\pi$ periodicity is enforced, according to an implementation of the present disclosure.

FIG. 3 is a data plot illustrating example dip angle estimates 300 based on the seismic image 200 in FIG. 2A before the π periodicity is enforced, according to an implementation of the present disclosure. The dip angle estimates 300 are obtained based on the math function atan 2, which returns a value between −π and π. A dip event can have a dip angle θ on one side and θ±π on the other side of the event causing the polarity changes.

Figure 4:
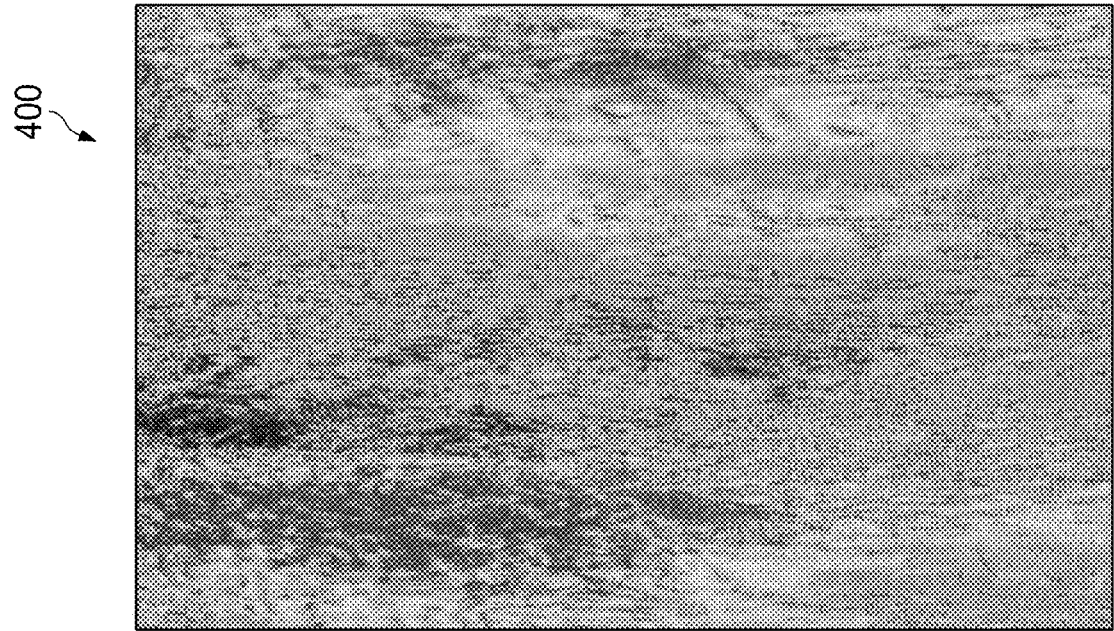
FIG. 4 is a data plot illustrating example dip angle estimates based on the seismic image 200 in FIG. 2A after the $\pi$ periodicity is enforced, according to an implementation of the present disclosure.

FIG. 4 is a data plot illustrating example dip angle estimates 400 based on the seismic image 200 in FIG. 2A after the π periodicity is enforced, according to an implementation of the present disclosure. Compared to the example dip angle estimates 300 in FIG. 3, the example dip angle estimates 400 in FIG. 4 show reasonable distribution and continuity of dip with some noise. The example dip angle estimates 400 have not been smoothed using anisotropic diffusion.

Figure 5:
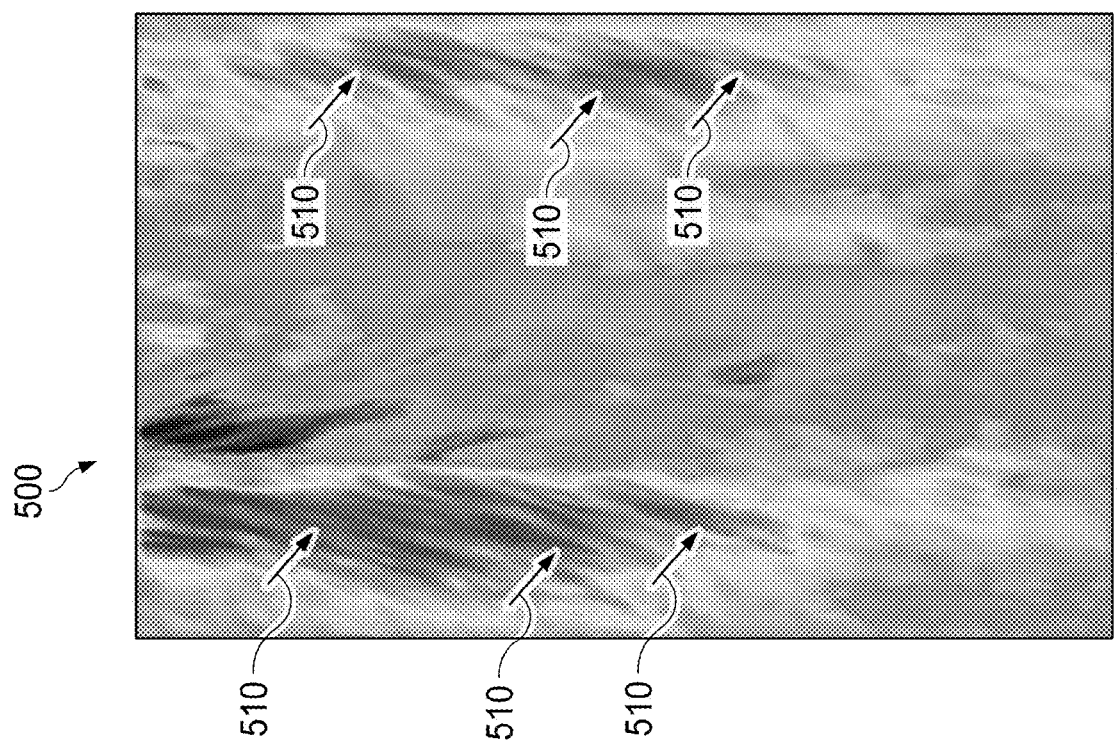
FIG. 5 is a data plot illustrating example dip angle estimates based on the seismic image 200 in FIG. 2A using anisotropic smoothing, according to an implementation of the present disclosure.

FIG. 5 is a data plot illustrating example dip angle estimates 500 based on the seismic image 200 in FIG. 2A using anisotropic smoothing, according to an implementation of the present disclosure. The example dip angle estimates 500 are dip angle estimates smoothed with anisotropic diffusion equation, for example, Equation (1). Compared to the example dip angle estimates 400 without smoothing using anisotropic diffusion in FIG. 4, the example dip angle estimates 500 smoothed with anisotropic diffusion shows less noise as pointed to by the arrows 510 in FIG. 5.

The example dip angle estimates 500 are resulted from 300 iterations. In some implementations, further increasing the number of iterations does not necessarily produce an appreciable change in the final output image. Convergence to the steady state solution is fast with inhomogeneous diffusion coefficients and no-flux boundary conditions. For example, the change at the 50th iteration using an $L_2$ norm (also known as the Euclidean norm) is less than 3.5% of the initial change. The overall structure of the dip in the raw estimate does not change much, but the speckled noise is smoothed out. Note that the initial dip estimate could be filtered before anisotropic smoothing if there is too much noise in the input image. In this example, image processing like median filtering is not applied. However, images with strong random noise may require such processing before anisotropic smoothing in order to get reasonable results.

Figure 6:
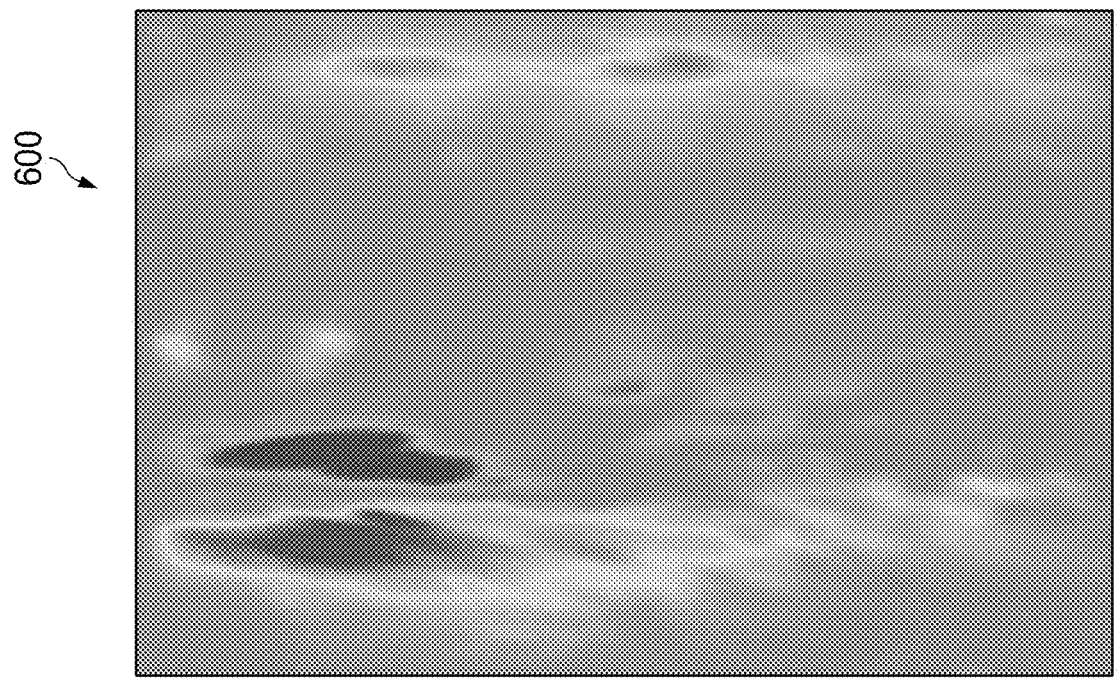
FIG. 6 is a data plot illustrating example dip angle estimates based on the seismic image 200 in FIG. 2A using plane wave destruction (PWD), according to an implementation of the present disclosure.

FIG. 6 is a data plot illustrating example dip angle estimates 600 based on the seismic image 200 in FIG. 2A using plane wave destruction (PWD), according to an implementation of the present disclosure. As can be seen, the example dip angle estimates 500 in FIG. 5 (using anisotropic diffusion smoothing) give slightly smaller dip angles compared to corresponding example dip angle estimates 600 using PWD shown in FIG. 6 because the peak values are reduced due to the smoothing.

Figure 7:
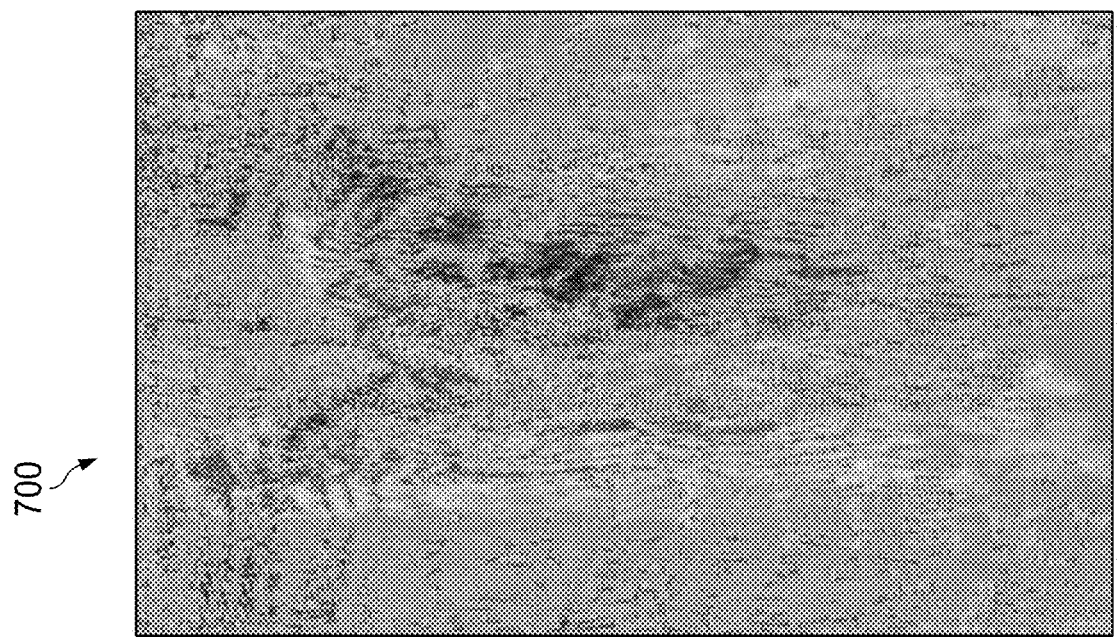
FIG. 7 is a data plot illustrating example dip angle estimates based on the seismic image 205 in FIG. 2B after enforcing the $\pi$ periodicity but before using anisotropic diffusion smooth, according to an implementation of the present disclosure.

FIG. 7 is a data plot illustrating example dip angle estimates 700 based on the seismic image 205 in FIG. 2B after enforcing the π periodicity but before using anisotropic diffusion smoothing, according to an implementation of the present disclosure. The example dip angle estimates 700 are raw dip estimates using the gradient without any smoothing or processing for the second input image, a salt body in the 2007 BP TTI model.

Figure 8:
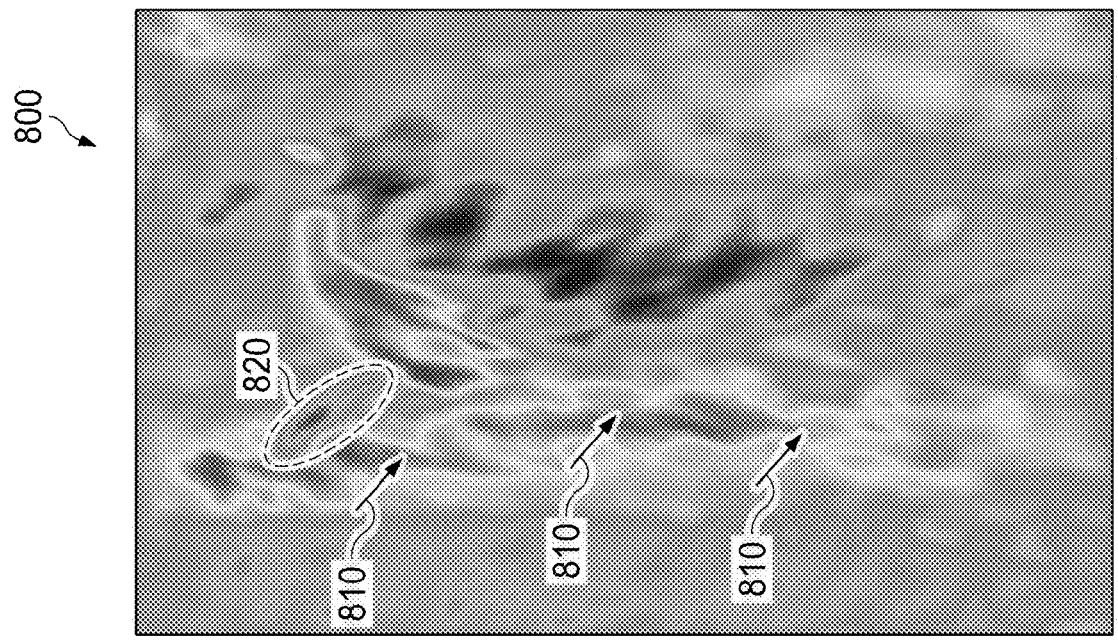
FIG. 8 is a data plot illustrating example dip angle estimates based on the seismic image 205 in FIG. 2B using anisotropic smoothing, according to an implementation of the present disclosure.

FIG. 8 is a data plot illustrating example dip angle estimates 800 based on the seismic image 205 in FIG. 2B using anisotropic smoothing, according to an implementation of the present disclosure. As in FIG. 5, the example dip angle estimates 800 are a smoothed version of the raw dip estimate 700 after 300 iterations. The overall structure is retained with fine details. For example, the results are consistent from top to bottom (please see the areas pointed to by the arrows 810) while the noise is reduced dramatically. A small region of opposite dip indicated by an ellipse 820 survives the smoothing. The color changes from FIG. 7 to FIG. 8, that are the peak values both in positive and negative, are reduced due to the smoothing. Compared with the input seismic image 205 in FIG. 2B, example dip angle estimates 800, based on the proposed method, provide a more consistent estimate of the dips below the salt flanks, where the signal-to-noise ratio is low.

Figure 9B:
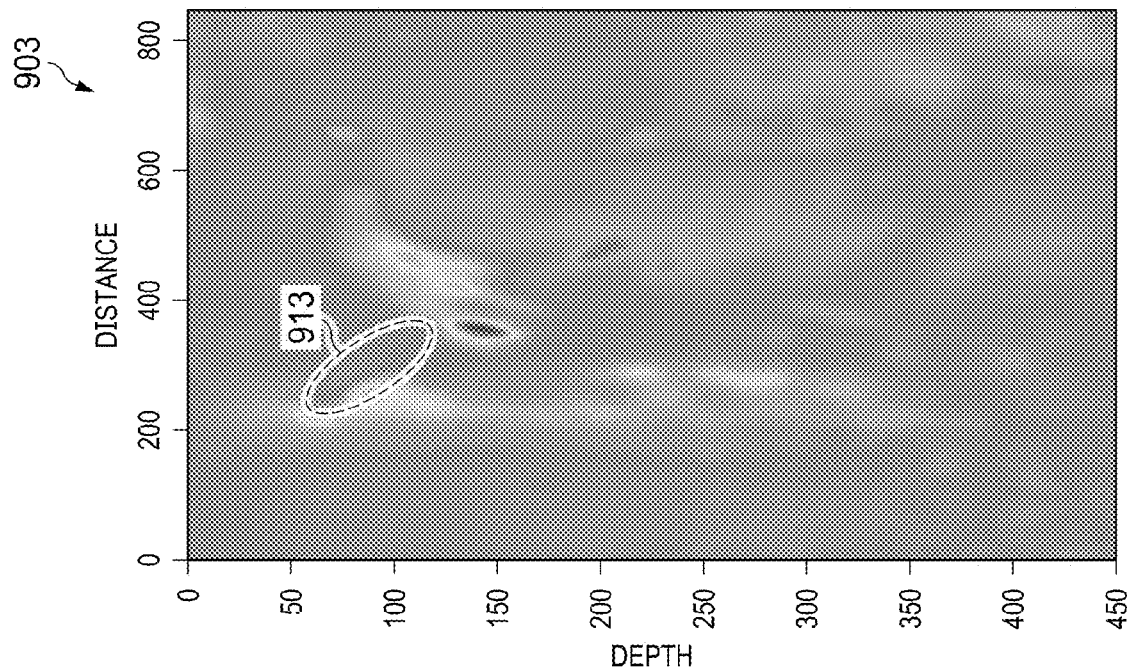
FIGS. 9A, 9B, and 9C are data plots illustrating example input seismic images of a salt body, example dip angle estimates using plane wave destruction (PWD), and example dip angle estimates using anisotropic diffusion smoothing, respectively, according to an implementation of the present disclosure.
Figure 9A:
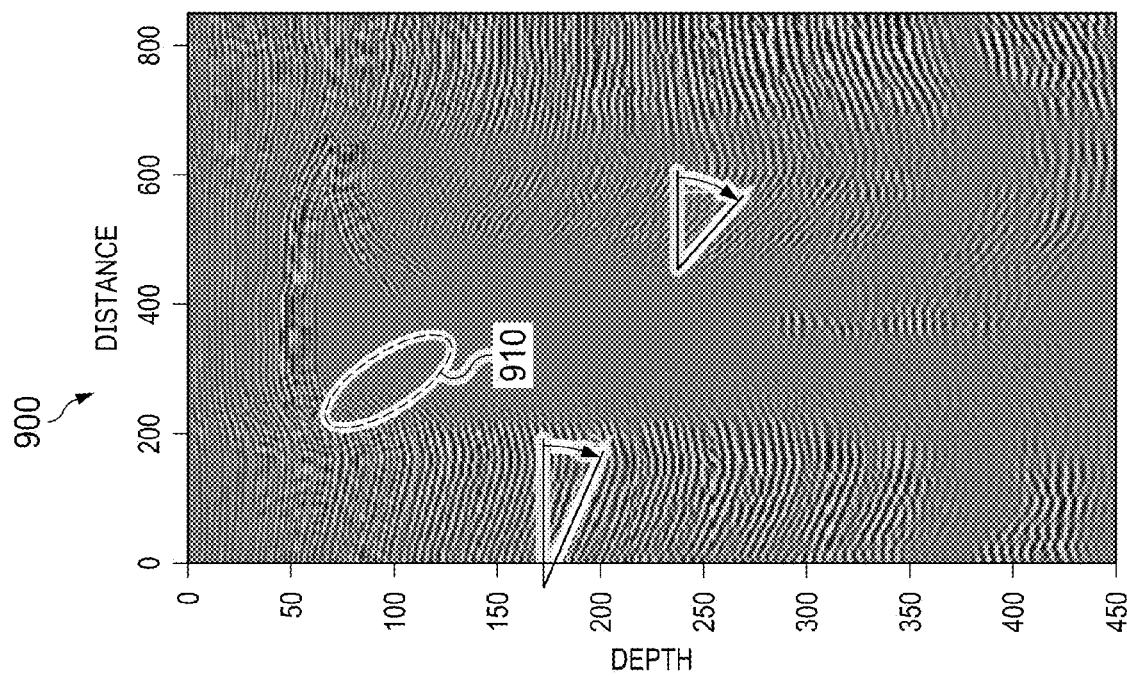
Figure 9C:
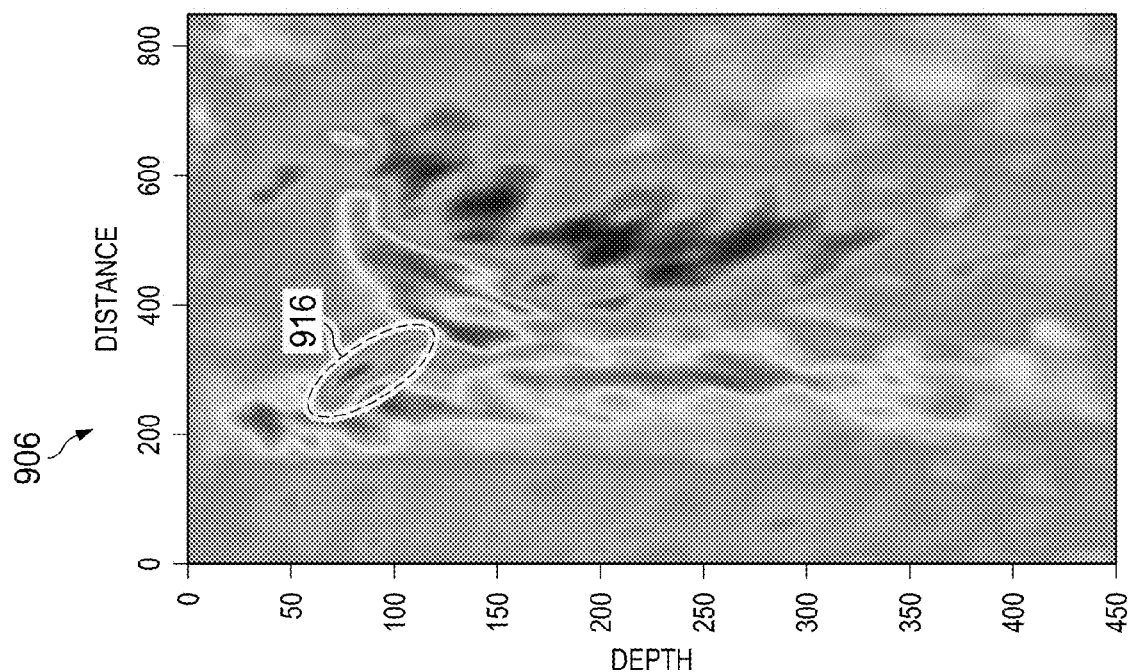

FIGS. 9A, 9B, and 9C are data plots illustrating example input seismic images 900 of a salt body, example dip angle estimates 903 using plane wave destruction (PWD), and example dip angle estimates 906 using anisotropic diffusion smoothing, respectively, according to an implementation of the present disclosure. The example dip angle estimates 800 using anisotropic diffusion smooth give smaller dips compared to the dip angle estimates 903 with PWD shown in FIG. 9B. In view of the example input seismic image 900 in FIG. 9A, the computed dip fields of the example dip angle estimates 906 in FIG. 9C shows that the described method provides consistent estimate of the dips below the salt flank. Even when the seismic signal (event) is weak as indicated by an ellipse 910 in FIG. 9A, dips fields are successfully estimated by the described method with anisotropic diffusion smoothing. The dip angle estimates 906 are comparable to and have higher resolution than the dip angle estimates 903 with PWD shown in FIG. 9B. The dipping event in an ellipse area 916 that has sharp directional changes from surrounding events is more clearly visible in FIG. 9C than a corresponding ellipse area 913 in FIG. 9B.

Figure 10:
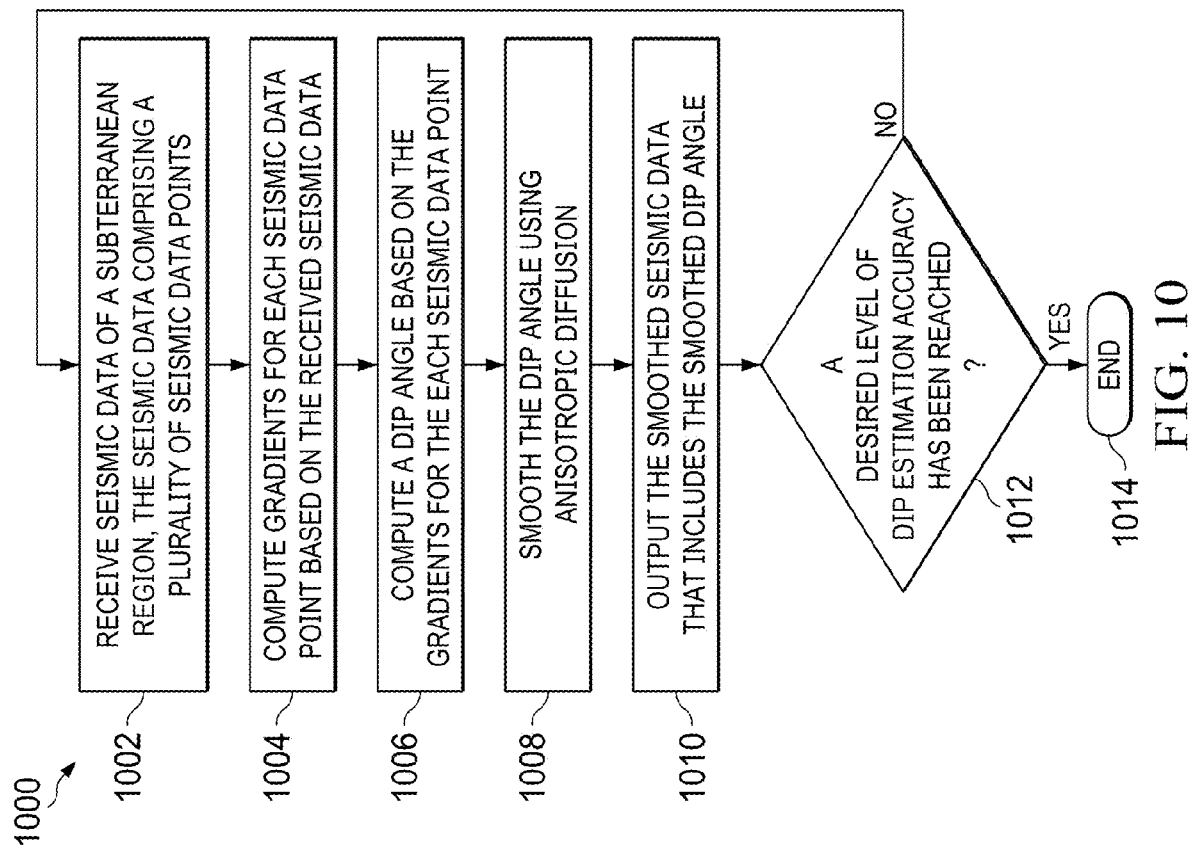
FIG. 10 is a flowchart of an example method for estimating geological dip based on seismic data, according to an implementation of the present disclosure.

FIG. 10 is a flowchart of an example method 1000 for estimating geological dip based on seismic data, according to an implementation of the present disclosure. For clarity of presentation, the description that follows generally describes method 1000 in the context of the other figures in this description. However, it will be understood that method 1000 may be performed, for example, by any suitable system, environment, software, and hardware, or a combination of systems, environments, software, and hardware, as appropriate. In some implementations, various steps of method 1000 can be run in parallel, in combination, in loops, or in any order.

At 1002, input seismic data is received. The input seismic data includes a plurality of seismic data points. Each seismic data point can be in a 2D, 3D, or even higher dimension. The seismic data point can be represented, for example, in an x-z plane or in an x-y plane. The seismic data point can be represented, for example, as a seismic image based on its coordinates, for example, as shown in FIG. 2A or 2B. In some implementations, the input seismic images are preprocessed, for example, to condition amplitudes, or to apply a smoothing operator before computing the gradients. In some implementations, the input seismic images are not pre-processed. From 1002, method 1000 proceeds to 1004.

At 1004, spatial gradients of a seismic data point are computed. In some implementations, the spatial gradients of a seismic data point are computed using a finite difference approximation as shown in step 110 in the example dip estimation algorithm in Table 1. In some implementations, the spatial gradients of a seismic data point are computed in another manner. From 1004, method 1000 proceeds to 1006.

At 1006, a dip angle (θ) is computed from the spatial gradients of the seismic data point. For example, the dip angle is computed using the atan 2 function as shown in step 120 in the example dip estimation algorithm in Table 1. In some implementations, computing the dip angle includes applying the periodicity of π to the dip angle computed using the atan 2 function, for example, in a manner such as step 130 in the example dip estimation algorithm in Table 1. For example, if θ≤−π/2, then use θ+π as θ. If θ>π/2, then use θ−π as θ. In some implementations, the dip angle of the seismic data point can be computed in another manner. In some implementations, the dip angle computed from the spatial gradients of the seismic data point can be referred to as a raw dip angle or an initial dip estimate. The initial dip estimates may be filtered before anisotropic smoothing for better results, for example, if there is too much noise in the input seismic image. The appropriate kind of filter depends on the noise characteristics, which will manifest more clearly in the dip angle estimate than the original image. In the examples shown in FIGS. 1-6, image processing, like median filtering, is not applied. However, seismic images with strong random noise may require such processing before anisotropic smoothing in order to get reasonable results. From 1006, method 1000 proceeds to 1008.

At 1008, the dip angle is smoothed using anisotropic smoothing. In some implementations, smoothing the dip angle using anisotropic diffusion includes smoothing the dip angle using anisotropic diffusion without a smoothing radius, a weighting parameter, or any other tuning or user parameters. In some implementations, the dip angle is smoothed using anisotropic smoothing in a manner similar to step 140 in the example dip estimation algorithm in Table 1. For example, each dip angle is smoothed using anisotropic smoothing by solving, for each seismic data point, an anisotropic diffusion equation (for example, the anisotropic diffusion equation (1)). The anisotropic diffusion equation can include a diffusion tensor with parameters computed directly from the seismic data (for example, such as the diffusion tensor shown in Equation (2) or (3)). In some implementations, the dip angle can be smoothed based on anisotropic smoothing in another manner. Note that the dip angles are smoothed directly instead of smoothing gradient vectors or computing structural tensors. Such angle dependent smoothing can preserve resolution for a given seismic image better than the plane wave destruction (PWD) method. From 1008, method 1000 proceeds to 1010.

At 1010, smoothed seismic data that includes the smoothed dip angle is output. In some implementations, the smoothed seismic data can be represented in a table, or another data structure for storage or communication. For example, the smoothed seismic data can be post-processed and used as input data to post-processing algorithms. In some implementations, the smoothed seismic data can be represented in an image, plot, map, diagram, or in another form, for example, for a user's review and analysis (in a manner similar to the representations in FIGS. 5 and 9A-9C). In some implementations, the smoothed seismic data can be output, on a printer, a plotter or a visual display. From 1010, method 1000 proceeds to 1012. When more accurate dip information is needed, some or all of the operations of the example method 1000 can be performed iteratively. For each iteration, the dip estimation can get more accurate without compromising resolution.

At 1012, a determination is made as to whether a desired level of dip estimation accuracy has been reached. If it is determined that the desired level of dip estimation accuracy has been reached, method 1000 proceeds to 1014. After 1014, method 1000 stops. Otherwise, if it is determined that the desired level of dip estimation accuracy has not been reached, method 10 proceeds from 1012 to 1002, where the smoothed seismic data is used as the input smoothed seismic data and the method 1000 continues.

Figure 11:
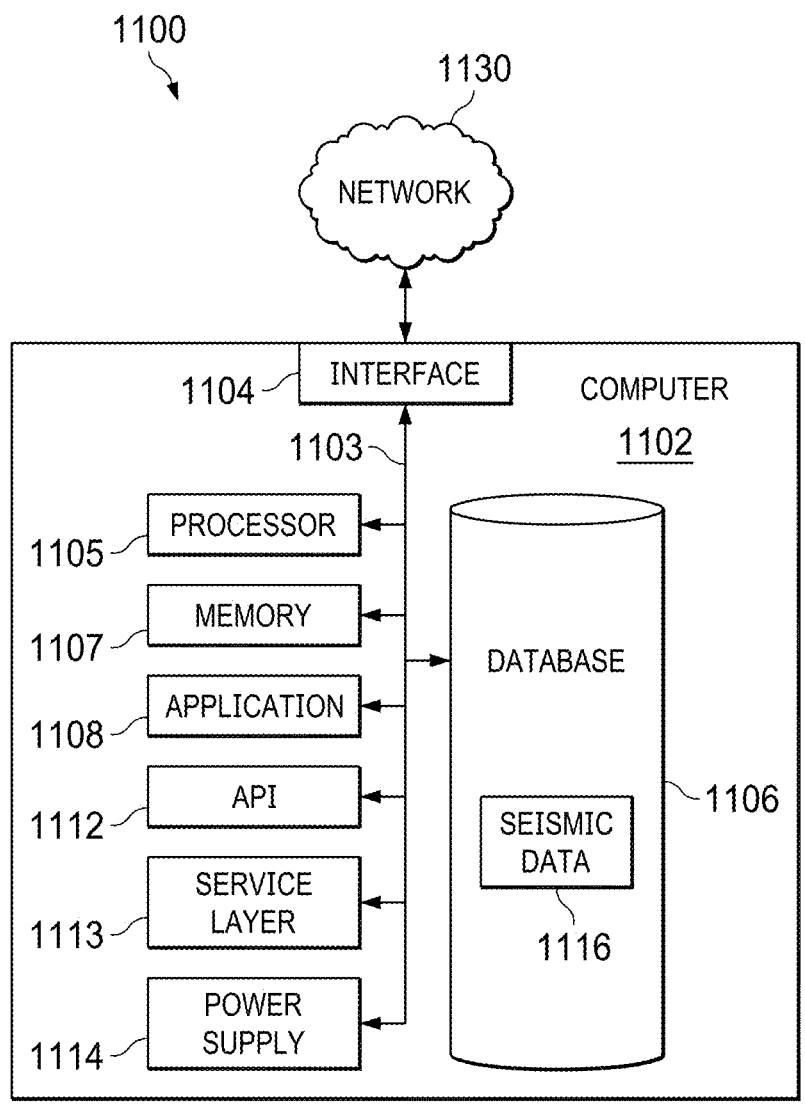
FIG. 11 is a block diagram illustrating an example computer system used to provide computational functionalities associated with described algorithms, methods, functions, processes, flows, and procedures as described in the instant disclosure, according to an implementation of the present disclosure.

FIG. 11 is a block diagram of an example computer system 1100 used to provide computational functionalities associated with described algorithms, methods, functions, processes, flows, and procedures, as described in the instant disclosure, according to an implementation of the present disclosure. The illustrated computer 1102 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1102 can include a computer that includes an input device, such as a keypad, keyboard, touch screen, or other device that can accept user information, and an output device that conveys information associated with the operation of the computer 1102, including digital data, visual, or audio information (or a combination of information), or a graphical-type user interface (UI) (or GUI).

The computer 1102 can serve in a role as a client, network component, a server, a database or other persistency, or any other component (or a combination of roles) of a computer system for performing the subject matter described in the instant disclosure. The illustrated computer 1102 is communicably coupled with a network 1130. In some implementations, one or more components of the computer 1102 can be configured to operate within environments, including cloud-computing-based, local, global, or other environment (or a combination of environments).

At a high level, the computer 1102 is an electronic computing device operable to receive, transmit, process, store, or manage data and information associated with the described subject matter. According to some implementations, the computer 1102 can also include or be communicably coupled with an application server, e-mail server, web server, caching server, streaming data server, or other server (or a combination of servers).

The computer 1102 can receive requests over network 1130 from a client application (for example, executing on another computer 1102) and respond to the received requests by processing the received requests using an appropriate software application(s). In addition, requests can also be sent to the computer 1102 from internal users (for example, from a command console or by other appropriate access method), external or third-parties, other automated applications, as well as any other appropriate entities, individuals, systems, or computers.

Each of the components of the computer 1102 can communicate using a system bus 1103. In some implementations, any or all of the components of the computer 1102, hardware or software (or a combination of both hardware and software), can interface with each other or the interface 1104 (or a combination of both), over the system bus 1103 using an application programming interface (API) 1112 or a service layer 1113 (or a combination of the API 1112 and service layer 1113). The API 1112 can include specifications for routines, data structures, and object classes. The API 1112 can be either computer-language independent or dependent and refer to a complete interface, a single function, or even a set of APIs. The service layer 1113 provides software services to the computer 1102 or other components (whether or not illustrated) that are communicably coupled to the computer 1102. The functionality of the computer 1102 can be accessible for all service consumers using this service layer. Software services, such as those provided by the service layer 1113, provide reusable, defined functionalities through a defined interface. For example, the interface can be software written in JAVA, C++, or other suitable language providing data in extensible markup language (XML) format or other suitable format. While illustrated as an integrated component of the computer 1102, alternative implementations can illustrate the API 1112 or the service layer 1113 as stand-alone components in relation to other components of the computer 1102 or other components (whether or not illustrated) that are communicably coupled to the computer 1102. Moreover, any or all parts of the API 1112 or the service layer 1113 can be implemented as child or sub-modules of another software module, enterprise application, or hardware module without departing from the scope of this disclosure.

The computer 1102 includes an interface 1104. Although illustrated as a single interface 1104 in FIG. 11, two or more interfaces 1104 can be used according to particular needs, desires, or particular implementations of the computer 1102. The interface 1104 is used by the computer 1102 for communicating with other systems that are connected to the network 1130 (whether illustrated or not) in a distributed environment. Generally, the interface 1104 includes logic encoded in software or hardware (or a combination of software and hardware) and is operable to communicate with the network 1130. More specifically, the interface 1104 can include software supporting one or more communication protocols associated with communications such that the network 1130 or interface's hardware is operable to communicate physical signals within and outside of the illustrated computer 1102.

The computer 1102 includes a processor 1105. Although illustrated as a single processor 1105 in FIG. 11, two or more processors can be used according to particular needs, desires, or particular implementations of the computer 1102. Generally, the processor 1105 executes instructions and manipulates data to perform the operations of the computer 1102 and any algorithms, methods, functions, processes, flows, and procedures as described in the instant disclosure.

The computer 1102 also includes a database 1106 that can hold data for the computer 1102 or other components (or a combination of both) that can be connected to the network 1130 (whether illustrated or not). For example, database 1106 can be an in-memory, conventional, or other type of database storing data consistent with this disclosure. In some implementations, database 1106 can be a combination of two or more different database types (for example, a hybrid in-memory and conventional database) according to particular needs, desires, or particular implementations of the computer 1102 and the described functionality. Although illustrated as a single database 1106 in FIG. 11, two or more databases (of the same or combination of types) can be used according to particular needs, desires, or particular implementations of the computer 1102 and the described functionality. While database 1106 is illustrated as an integral component of the computer 1102, in alternative implementations, database 1106 can be external to the computer 1102. As illustrated, the database 1106 holds previously described seismic data 1116.

The computer 1102 also includes a memory 1107 that can hold data for the computer 1102 or other components (or a combination of both) that can be connected to the network 1130 (whether illustrated or not). Memory 1107 can store any data consistent with this disclosure. In some implementations, memory 1107 can be a combination of two or more different types of memory (for example, a combination of semiconductor and magnetic storage) according to particular needs, desires, or particular implementations of the computer 1102 and the described functionality. Although illustrated as a single memory 1107 in FIG. 11, two or more memories 1107 (of the same or combination of types) can be used according to particular needs, desires, or particular implementations of the computer 1102 and the described functionality. While memory 1107 is illustrated as an integral component of the computer 1102, in alternative implementations, memory 1107 can be external to the computer 1102.

The application 1108 is an algorithmic software engine providing functionality according to particular needs, desires, or particular implementations of the computer 1102, particularly with respect to functionality described in this disclosure. For example, application 1108 can serve as one or more components, modules, or applications. Further, although illustrated as a single application 1108, the application 1108 can be implemented as multiple applications 1108 on the computer 1102. In addition, although illustrated as integral to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion or management circuits (including recharging, standby, or other power management functionality). In some implementations, the power-supply 1114 can include a power plug to allow the computer 1102 to be plugged into a wall socket or other power source to, for example, power the computer 1102 or recharge a rechargeable battery.

There can be any number of computers 1102 associated with, or external to, a computer system containing computer 1102, each computer 1102 communicating over network 1130. Further, the term "client," "user," and other appropriate terminology can be used interchangeably, as appropriate, without departing from the scope of this disclosure. Moreover, this disclosure contemplates that many users can use one computer 1102, or that one user can use multiple computers 1102.

Described implementations of the subject matter can include one or more features, alone or in combination.

For example, in a first implementation, a computer-implemented method include receiving, by data processing apparatus, seismic data of a subterranean region, the seismic data including a plurality of seismic data points; computing, by the data processing apparatus, gradients for each seismic data point based on the received seismic data; computing, by the data processing apparatus, a dip angle based on the gradients for the each seismic data point; and smoothing, by the data processing apparatus, the dip angle using anisotropic diffusion.

The foregoing and other described implementations can each, optionally, include one or more of the following features:

A first feature, combinable with any of the following features, wherein computing the dip angle based on the gradients for the each seismic data point further includes computing the dip angle based on an atan 2 function.

A second feature, combinable with any of the previous or following features, wherein computing the dip angle based on the gradients for the each seismic data point further includes applying a periodicity of $\pi$ to the dip angle computed based on the atan 2 function.

A third feature, combinable with any of the previous or following features, wherein smoothing the dip angle using anisotropic diffusion includes solving, for each seismic data point, an anisotropic diffusion equation.

A fourth feature, combinable with any of the previous or following features, wherein smoothing the dip angle using anisotropic diffusion includes smoothing the dip angle using anisotropic diffusion without computing or storing a structure tensor based on the received seismic data.

A fifth feature, combinable with any of the previous or following features, wherein smoothing the dip angle using anisotropic diffusion includes smoothing the dip angle using anisotropic diffusion without a smoothing radius or a weighting parameter.

A sixth feature, combinable with any of the previous or following features, wherein smoothing the dip angle using anisotropic diffusion includes solving, for each seismic data point, an anisotropic diffusion equation.

A seventh feature, combinable with any of the previous or following features, wherein solving, for each seismic data point, the anisotropic diffusion equation includes solving, for each seismic data point, the anisotropic diffusion equation with a diffusion tensor with parameters computed directly from the received seismic data.

A eighth feature, combinable with any of the previous or following features, including outputting smoothed seismic data that includes the smoothed dip angle.

In a second implementation, a non-transitory, computer-readable medium storing one or more instructions executable by a computer system to perform operations includes receiving seismic data of a subterranean region, the seismic data including a plurality of seismic data points; computing gradients for each seismic data point based on the received seismic data; computing a dip angle based on the gradients for the each seismic data point; and smoothing the dip angle using anisotropic diffusion.

The foregoing and other described implementations can each, optionally, include one or more of the following features:

A first feature, combinable with any of the following features, wherein computing the dip angle based on the gradients for the each seismic data point further includes computing the dip angle based on an atan 2 function; and applying a periodicity of $\pi$ to the dip angle computed based on the atan 2 function.

A second feature, combinable with any of the previous or following features, wherein smoothing the dip angle using anisotropic diffusion includes solving, for each seismic data point, an anisotropic diffusion equation.

A third feature, combinable with any of the previous or following features, wherein smoothing the dip angle using anisotropic diffusion includes smoothing the dip angle using anisotropic diffusion without computing or storing a structure tensor based on the received seismic data.

A fourth feature, combinable with any of the previous or following features, wherein smoothing the dip angle using anisotropic diffusion includes smoothing the dip angle using anisotropic diffusion without a smoothing radius or a weighting parameter.

A fifth feature, combinable with any of the previous or following features, wherein smoothing the dip angle using anisotropic diffusion includes solving, for each seismic data point, an anisotropic diffusion equation.

A sixth feature, combinable with any of the previous or following features, wherein solving, for each seismic data point, the anisotropic diffusion equation includes solving, for each seismic data point, the anisotropic diffusion equation with a diffusion tensor with parameters computed directly from the received seismic data.

In a third implementation, a computer-implemented system includes one or more computers; and one or more computer memory devices interoperably coupled with the one or more computers and having tangible, non-transitory, machine-readable media storing instructions that, when executed by the one or more computers, perform operations including: receiving seismic data of a subterranean region, the seismic data including a plurality of seismic data points; computing gradients for each seismic data point based on the received seismic data; computing a dip angle based on the gradients for the each seismic data point; and smoothing the dip angle using anisotropic diffusion.

The foregoing and other described implementations can each, optionally, include one or more of the following features:

A first feature, combinable with any of the following features, wherein computing the dip angle based on the gradients for the each seismic data point further includes computing the dip angle based on an atan 2 function; and applying a periodicity of $\pi$ to the dip angle computed based on the atan 2 function.

A second feature, combinable with any of the previous or following features, wherein smoothing the dip angle using anisotropic diffusion includes solving, for each seismic data point, an anisotropic diffusion equation.

A third feature, combinable with any of the previous or following features, wherein smoothing the dip angle using anisotropic diffusion includes smoothing the dip angle using anisotropic diffusion without computing or storing a structure tensor based on the received seismic data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which can also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs can instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/–R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory can include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network can communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
receiving, by data processing apparatus, seismic data of a subterranean region, the seismic data comprising a plurality of seismic data points;
computing, by the data processing apparatus, gradients for each seismic data point based on the received seismic data;
computing, by the data processing apparatus, a dip angle based on the gradients for each seismic data point;
correcting the computed dip angle including computing a corrected dip angle by: 1) adding pi to the computed dip angle when the computed dip angle is less than or equal to $-\rho/2$, and 2) subtracting pi from the computed dip angle when the computed dip angle is greater than $\pi/2$;
updating, by the data processing apparatus, the corrected dip angle including computing an updated dip angle by smoothing the corrected dip angle using anisotropic diffusion, including solving, for each seismic data point, an anisotropic diffusion equation given by:

$$\frac{\partial u(x, z, t)}{\partial t} = \nabla \cdot [D(x, z) \nabla u(x, z, t)]$$

for an x-z plane over time t, where the diffusion coefficient $D(x,z)$ is given as:

$$D(x,z) = I - \alpha N_x^T N_x = \begin{bmatrix} 1 - \alpha s^2\theta & \alpha s\theta c\theta \\ \alpha s\theta c\theta & 1 - \alpha c^2\theta \end{bmatrix}$$

wherein s$\theta$, c$\theta$, s$^2\theta$, and c$^2\theta$ denote sin $\theta$, cos $\theta$, sin$^2$ $\theta$, and cos$^2$ $\theta$, respectively for dip angle $\theta$, and for input I, unit normal vector N, constant T, and generalization parameter $\alpha$; and controlling, by the data processing apparatus and in response to updating the corrected dip angle, a direction and a speed of a hydrocarbon-recovery-type drill, wherein controlling the direction and the speed of the hydrocarbon-recovery-type drill uses outputs of a data package uploaded to a separate computer, wherein the data package is used to design, plan, control, and manage a drilling system, and wherein controlling the direction and the speed of the hydrocarbon-recovery-type drill includes using the direction and the speed in drilling decisions and providing notifications and alarms associated with the direction and the speed.

2. The computer-implemented method of claim 1, wherein computing the dip angle based on the gradients for the each seismic data point further comprises computing the dip angle based on an atan 2 function.

3. The computer-implemented method of claim 1, wherein smoothing the corrected dip angle using anisotropic diffusion comprises smoothing the corrected dip angle using anisotropic diffusion in the absence of computing or storing a structure tensor based on the received seismic data.

4. The computer-implemented method of claim 1, wherein smoothing the corrected dip angle using anisotropic diffusion comprises smoothing the corrected dip angle using anisotropic diffusion in the absence of a smoothing radius or a weighting parameter.

5. The computer-implemented method of claim 1, wherein smoothing the corrected dip angle using anisotropic diffusion comprises solving, for each seismic data point, an anisotropic diffusion equation.

6. The computer-implemented method of claim 1, wherein solving, for each seismic data point, the anisotropic diffusion equation comprises solving, for each seismic data point, the anisotropic diffusion equation with a diffusion tensor with parameters computed directly from the received seismic data.

7. The computer-implemented method of claim 1, comprising outputting smoothed seismic data that includes the updated dip angle.

8. A non-transitory, computer-readable medium storing one or more instructions executable by a computer system to perform operations comprising:
receiving seismic data of a subterranean region, the seismic data comprising a plurality of seismic data points;
computing gradients for each seismic data point based on the received seismic data;
computing a dip angle based on the gradients for each seismic data point;
correcting the computed dip angle including computing a corrected dip angle by: 1) adding pi to the computed dip angle when the computed dip angle is less than or equal to $-\pi/2$, and 2) subtracting pi from the computed dip angle when the computed dip angle is greater than $\pi/2$;
updating the corrected dip angle including computing an updated dip angle by smoothing the corrected dip angle using anisotropic diffusion, including solving, for each seismic data point, an anisotropic diffusion equation given by:

$$\frac{\partial u(x,z,t)}{\partial t} = \nabla \cdot [D(x,z)\nabla u(x,z,t)]$$

for an x-z plane over time t, where the diffusion coefficient D(x,z) is given as:

$$D(x,z) = I - \alpha N_x^T N_x = \begin{bmatrix} 1 - \alpha s^2\theta & \alpha s\theta c\theta \\ \alpha s\theta c\theta & 1 - \alpha c^2\theta \end{bmatrix}$$

wherein s$\theta$, c$\theta$, s$^2\theta$, and c$^2\theta$ denote sin $\theta$, cos $\theta$, sin$^2$ $\theta$, and cos$^2$ $\theta$, respectively for dip angle $\theta$, and for input I, unit normal vector N, constant T, and generalization parameter $\alpha$; and controlling in response to updating the corrected dip angle, a direction and a speed of a hydrocarbon-recovery-type drill, wherein controlling the direction and the speed of the hydrocarbon-recovery-type drill uses outputs of a data package uploaded to a separate computer, wherein the data package is used to design, plan, control, and manage a drilling system, and wherein controlling the direction and the speed of the hydrocarbon-recovery-type drill includes using the direction and the speed in drilling decisions and providing notifications and alarms associated with the direction and the speed.

9. The non-transitory, computer-readable medium of claim 8, wherein smoothing the corrected dip angle using anisotropic diffusion comprises smoothing the corrected dip angle using anisotropic diffusion in the absence of computing or storing a structure tensor based on the received seismic data.

10. The non-transitory, computer-readable medium of claim 8, wherein smoothing the corrected dip angle using anisotropic diffusion comprises smoothing the corrected dip angle using anisotropic diffusion in the absence of a smoothing radius or a weighting parameter.

11. The non-transitory, computer-readable medium of claim 8, wherein smoothing the corrected dip angle using anisotropic diffusion comprises solving, for each seismic data point, an anisotropic diffusion equation.

12. The non-transitory, computer-readable medium of claim 8, wherein solving, for each seismic data point, the anisotropic diffusion equation comprises solving, for each seismic data point, the anisotropic diffusion equation with a diffusion tensor with parameters computed directly from the received seismic data.

13. A computer-implemented system, comprising:
one or more computers; and
one or more computer memory devices interoperably coupled with the one or more computers and having tangible, non-transitory, machine-readable media storing instructions that, when executed by the one or more computers, perform operations comprising:
receiving seismic data of a subterranean region, the seismic data comprising a plurality of seismic data points;
computing gradients for each seismic data point based on the received seismic data;

computing a dip angle based on the gradients for each seismic data point;

correcting the computed dip angle including computing a corrected dip angle by: 1) adding pi to the computed dip angle when the computed dip angle is Jess than or equal to $-\pi/2$, and 2) subtracting pi from the computed dip angle when the computed dip angle is greater than $\pi/2$;

updating the corrected dip angle including computing an updated dip angle by smoothing the corrected dip angle using anisotropic diffusion, including solving, for each seismic data point, an anisotropic diffusion equation given by:

$$\frac{\partial u(x, z, t)}{\partial t} = \nabla \cdot [D(x, z) \nabla u(x, z, t)]$$

for an x-z plane over time t, where the diffusion coefficient D(x,z) is given as:

$$D(x, z) = I - \alpha N_x^T N_x = \begin{bmatrix} 1 \alpha s^2\theta & \alpha s\theta c\theta \\ \alpha s\theta c\theta & 1 - \alpha c^2\theta \end{bmatrix}$$

wherein $s\theta$, $c\theta$, $s^2\theta$, and $c^2\theta$ denote $\sin \theta$, $\cos \theta$, $\sin^2 \theta$, and $\cos^2 \theta$, respectively for dip angle $\theta$, and for input I, unit normal vector N, constant T, and generalization parameter $\alpha$; and controlling and in response to updating the corrected dip angle, a direction and a speed of a hydrocarbon-recovery-type drill, wherein controlling the direction and the speed of the hydrocarbon-recovery-type drill uses outputs of a data package uploaded to a separate computer, wherein the data package is used to design, plan, control, and manage a drilling system, and wherein controlling the direction and the speed of the hydrocarbon-recovery-type drill includes using the direction and the speed in drilling decisions and providing notifications and alarms associated with the direction and the speed.

14. The computer-implemented system of claim 13, wherein smoothing the corrected dip angle using anisotropic diffusion comprises smoothing the corrected dip angle using anisotropic diffusion in the absence of computing or storing a structure tensor based on the received seismic data.

\* \* \* \* \*

UNITED STATES PATENT AND TRADEMARK OFFICE
CERTIFICATE OF CORRECTION

| | |
|---|---|
| PATENT NO. | : 11,353,610 B2 |
| APPLICATION NO. | : 16/139395 |
| DATED | : June 7, 2022 |
| INVENTOR(S) | : Hyoungsu Baek |

It is certified that error appears in the above-identified patent and that said Letters Patent is hereby corrected as shown below:

On the Title Page

Column 2, Item (56) in OTHER PUBLICATIONS, Line 3, please replace "Atan2)" with -- Atan2. --.

In the Claims

In Column 20, Line 54, Claim 1, please replace "–$\rho$/2," with -- –$\pi$/2, --.

In Column 23, Line 5, Claim 13, place replace "is Jess" with -- is less --.

Signed and Sealed this
Thirteenth Day of December, 2022

Katherine Kelly Vidal
*Director of the United States Patent and Trademark Office*